United States Patent
Mitchell

(10) Patent No.: US 6,851,692 B2
(45) Date of Patent: Feb. 8, 2005

(54) TRAILER HITCH STEP WITH BALL MOUNT

(76) Inventor: Jeffrey R. Mitchell, 7764 Bass Ridge Trail, Tallahassee, FL (US) 32312

( * ) Notice: Subject to any disclaimer, the term of this patent is extended or adjusted under 35 U.S.C. 154(b) by 0 days.

(21) Appl. No.: 10/369,174

(22) Filed: Feb. 18, 2003

(65) Prior Publication Data

US 2004/0160034 A1 Aug. 19, 2004

(51) Int. Cl.$^7$ .................................................. B60R 3/00
(52) U.S. Cl. ................................... 280/163; 280/164.2
(58) Field of Search .................... 280/166, 163, 280/164.1, 164.2, 169, 415.1, 455.1, 511, 482, 760; 182/91, 92, 127; 224/519, 520, 521, 524; D12/162, 203

(56) References Cited

U.S. PATENT DOCUMENTS

| | | | |
|---|---|---|---|
| 3,580,613 A | 5/1971 | Northrop | |
| 3,794,345 A | 2/1974 | Locke | |
| 4,906,015 A * | 3/1990 | LaCroix et al. | 280/415.1 |
| 5,738,362 A | 4/1998 | Ludwick | |
| 5,799,961 A | 9/1998 | Schmeets | |
| 5,897,125 A | 4/1999 | Bundy | |
| 6,145,861 A * | 11/2000 | Willis | 280/163 |
| D451,060 S * | 11/2001 | McCoy et al. | D12/162 |
| D463,345 S * | 9/2002 | Cipolla | D12/203 |
| 6,474,668 B2 | 11/2002 | Debo | |
| 6,491,315 B2 | 12/2002 | Hagen et al. | |
| 6,511,086 B2 * | 1/2003 | Schlicht | 280/166 |
| 6,659,484 B2 * | 12/2003 | Knodle et al. | 280/166 |
| 6,682,086 B1 * | 1/2004 | Erickson | 280/166 |

* cited by examiner

Primary Examiner—Hau Phan
(74) Attorney, Agent, or Firm—John Wiley Horton

(57) ABSTRACT

A step configured to be attached to the drawbar of a trailer hitch. The step incorporates a hole and a ball mount receiver. The ball mount receiver is placed over the ball mount on the hitch. The hole allows the hitch ball and its accompanying lock washer and nut to be used to simultaneously mount the step and the hitch ball. The step is shaped to allow free access to the hitch ball so that a trailer can be attached while the step remains in place. The step then allows a user to step up and over the hitch with attached trailer.

16 Claims, 11 Drawing Sheets

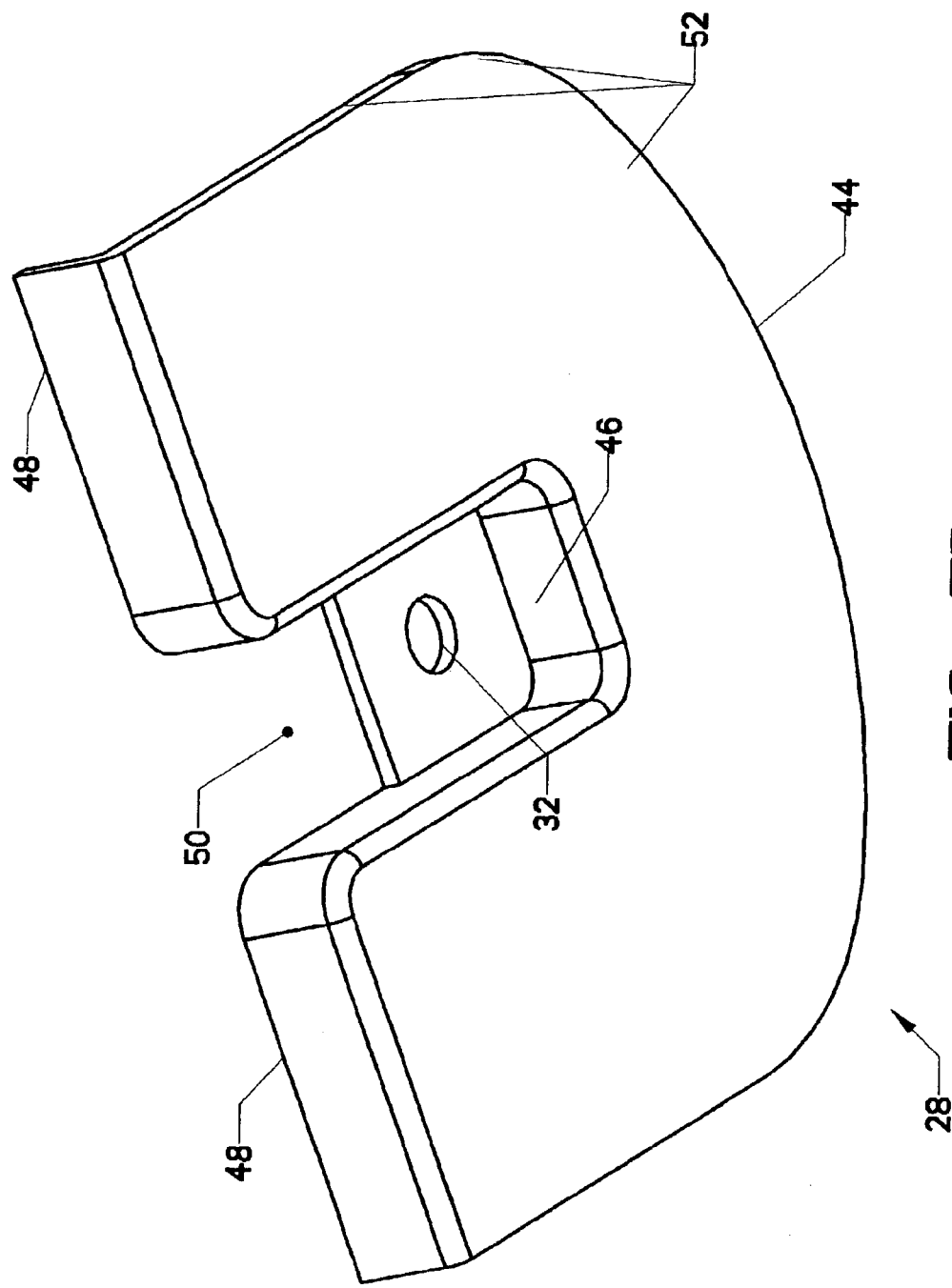

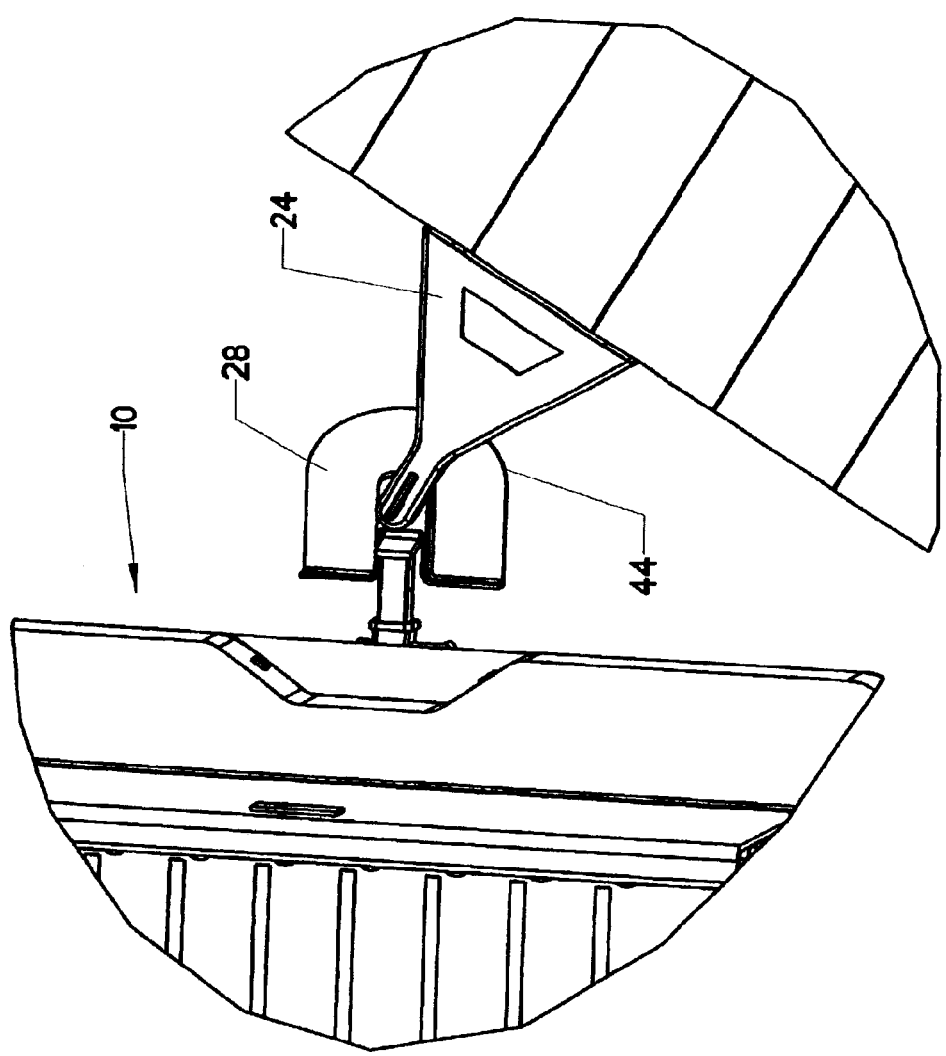

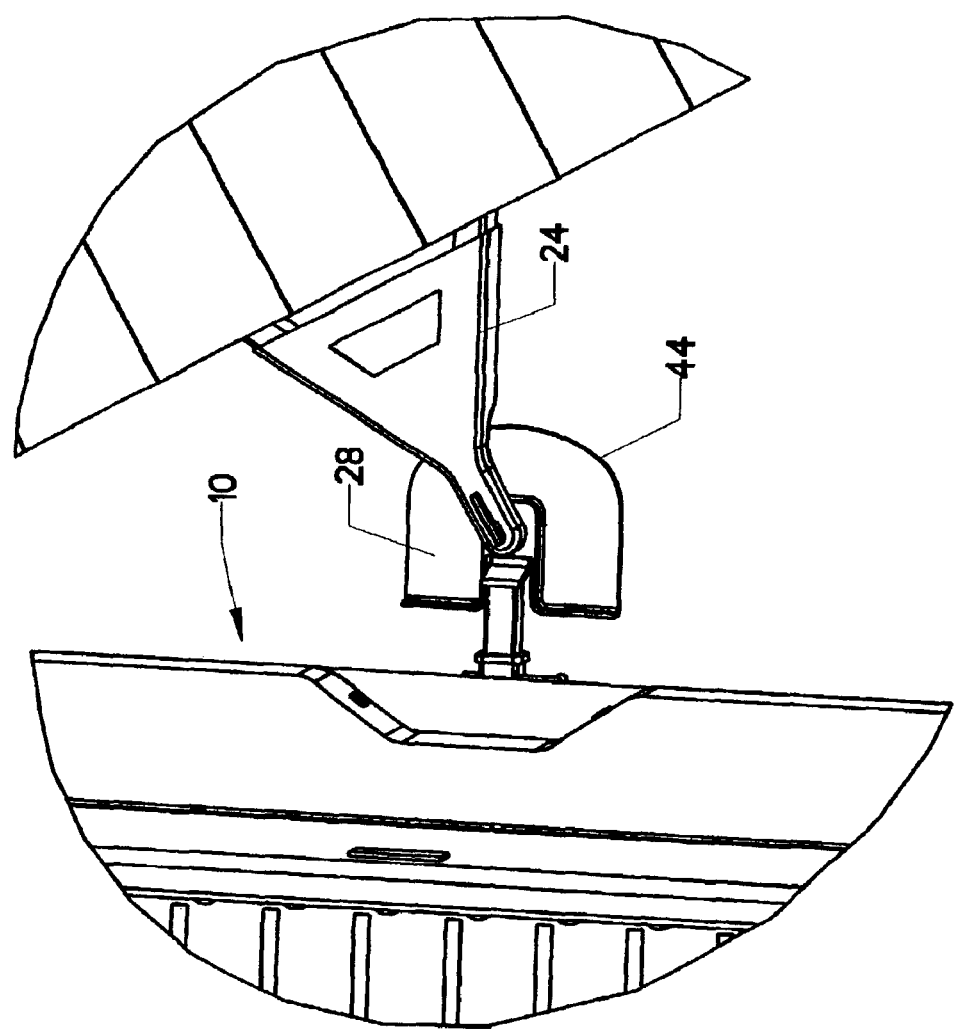

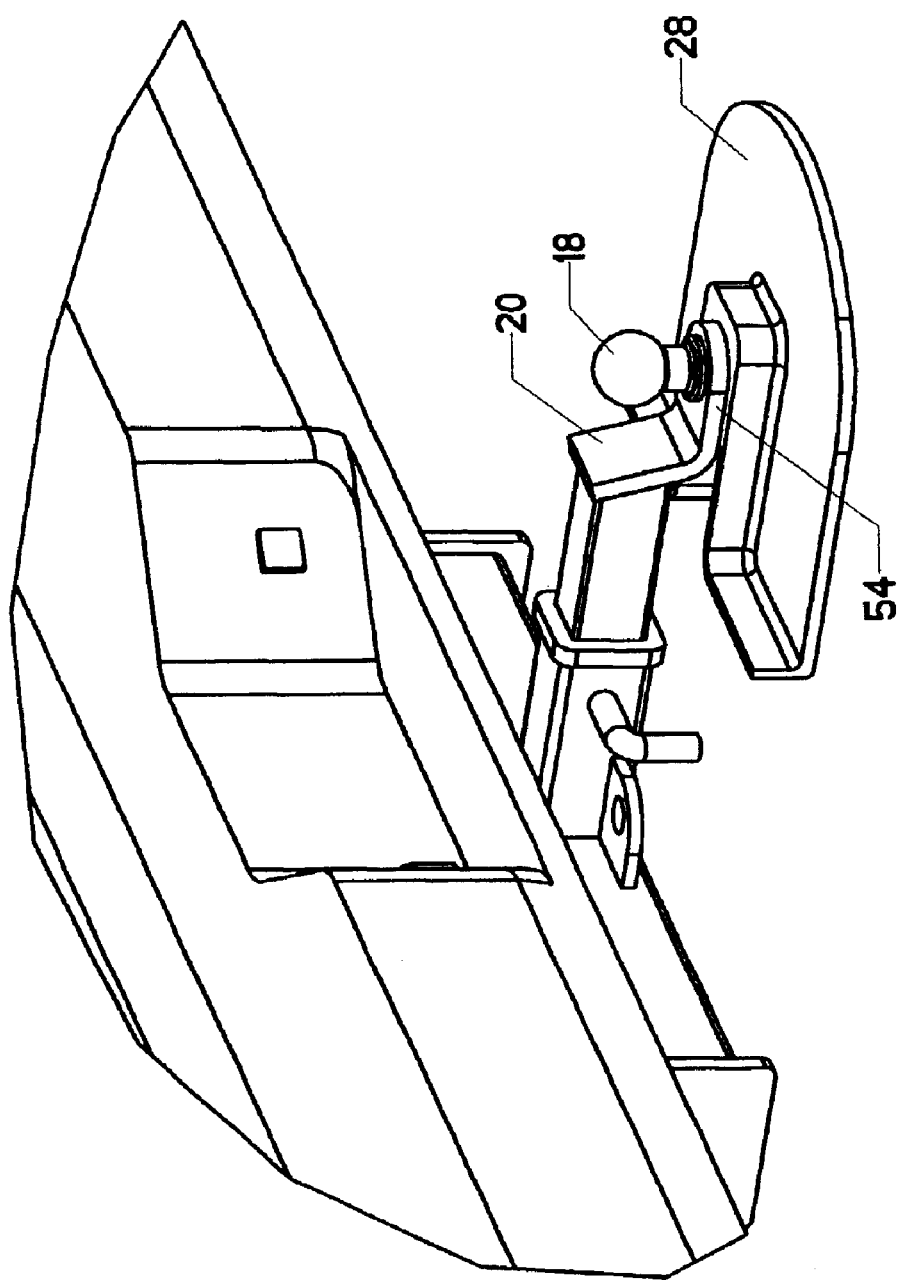

TRAILER HITCH STEP WITH BALL MOUNT

CROSS-REFERENCES TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of trailer hitches. More specifically, the invention comprises a step configured to be attached to a prior art trailer hitch while still allowing the attachment of a trailer to the hitch ball.

2. Description of the Related Art

FIG. 1 depicts a common prior art trailer hitch. Truck 10 incorporates hitch frame 12, which includes receiver 14. Drawbar 16 is sized to slide into receiver 14, where it is locked in place by a device such as cross pin 40. Ball mount 20 is attached to the distal end of drawbar 16. It includes a hole for mounting hitch ball 18, which is typically attached with a lock washer and large nut.

Those skilled in the art will know that the components just described are subjected to considerable mechanical stress when a trailer is attached to hitch ball 18. Thus, the components are typically fabricated of thick steel. FIG. 2 shows drawbar 16 locked in place within receiver 14. A trailer 22 is attached by locking receptacle 26 over hitch ball 18. The portion connecting receptacle 26 to the bulk of the trailer's structure is commonly known as a "tongue"—denoted in the view as tongue 24.

FIG. 2 represents a common situation whenever a trailer is attached to a vehicle. A user often desires to walk around the rear of the vehicle. The position of drawbar 16 and tongue 24 creates an impediment to the desired path of travel. The user must step over this impediment. As these structures are typically 18 inches or so off the ground, a user must often step onto the structures and then step over them. This represents a hazardous situation. In the case of a boat launch or recovery the situation is especially hazardous, since the components are often wet and the vehicle and trailer are parked on an inclined ramp surface.

Many persons elect to avoid the hazard by simply walking around the vehicle or trailer. FIG. 3 shows the entire truck 10 and trailer 22. The reader will observe that in order to cross from one side of the hitch to the other, the user must walk a very long and circuitous path. Thus, the temptation to step over the hitch is often present, even though the person knows it is hazardous.

BRIEF SUMMARY OF THE PRESENT INVENTION

The present invention comprises a step configured to be attached to the drawbar of a prior art trailer hitch. The step incorporates a hole and a ball mount receiver. The ball mount receiver is placed over the ball mount on the prior art hitch. The hole allows the hitch ball and its accompanying lock washer and nut to be used to simultaneously mount the step and the hitch ball. The step is shaped to allow free access to the hitch ball so that a trailer can be attached while the step remains in place. The step then allows a user to step up and over the hitch with attached trailer.

BRIEF DESCRIPTION OF THE SEVERAL VIEWS OF THE DRAWINGS

FIG. 7B is an isometric view of the present invention.

FIG. 8 is an isometric view, showing how the invention provides clearance for a trailer tongue.

FIG. 9 is an isometric view, showing how the invention provides clearance for a trailer tongue.

FIG. 10 is an isometric view, showing an alternate installation of the invention.

REFERENCE NUMERALS IN THE DRAWINGS

| | | | |
|---|---|---|---|
| 10 | truck | 12 | hitch frame |
| 14 | receiver | 16 | drawbar |
| 18 | hitch ball | 20 | ball mount |
| 22 | trailer | 24 | tongue |
| 26 | receptacle | 28 | hitch step |
| 30 | threaded shaft | 32 | hole |
| 34 | hole | 36 | lock washer |
| 38 | nut | 40 | cross pin |
| 42 | stepping surface | 44 | clearance arc |
| 46 | ball mount receiver | 48 | flange |
| 50 | relief cut | 52 | main plate |
| 54 | horizontal position | | |

DETAILED DESCRIPTION OF THE INVENTION

Figure 1:
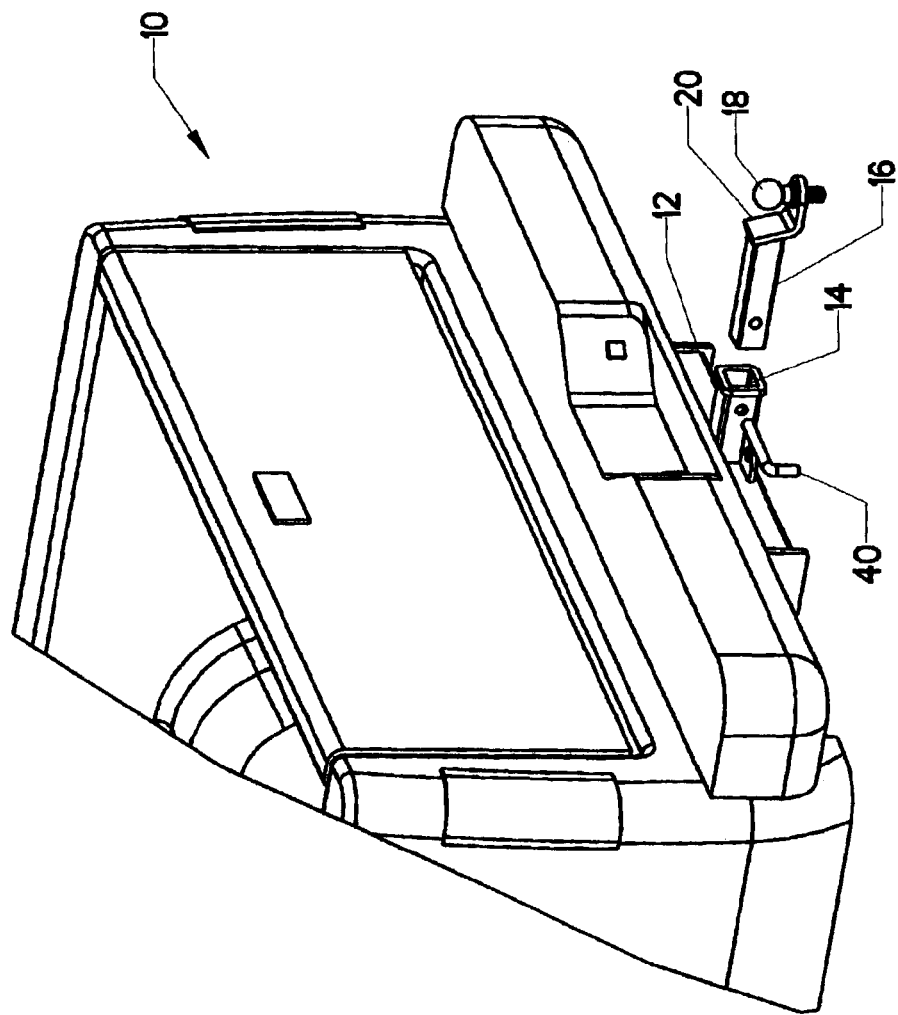
FIG. 1 is a perspective view, showing a prior art trailer hitch assembly.
Figure 2:
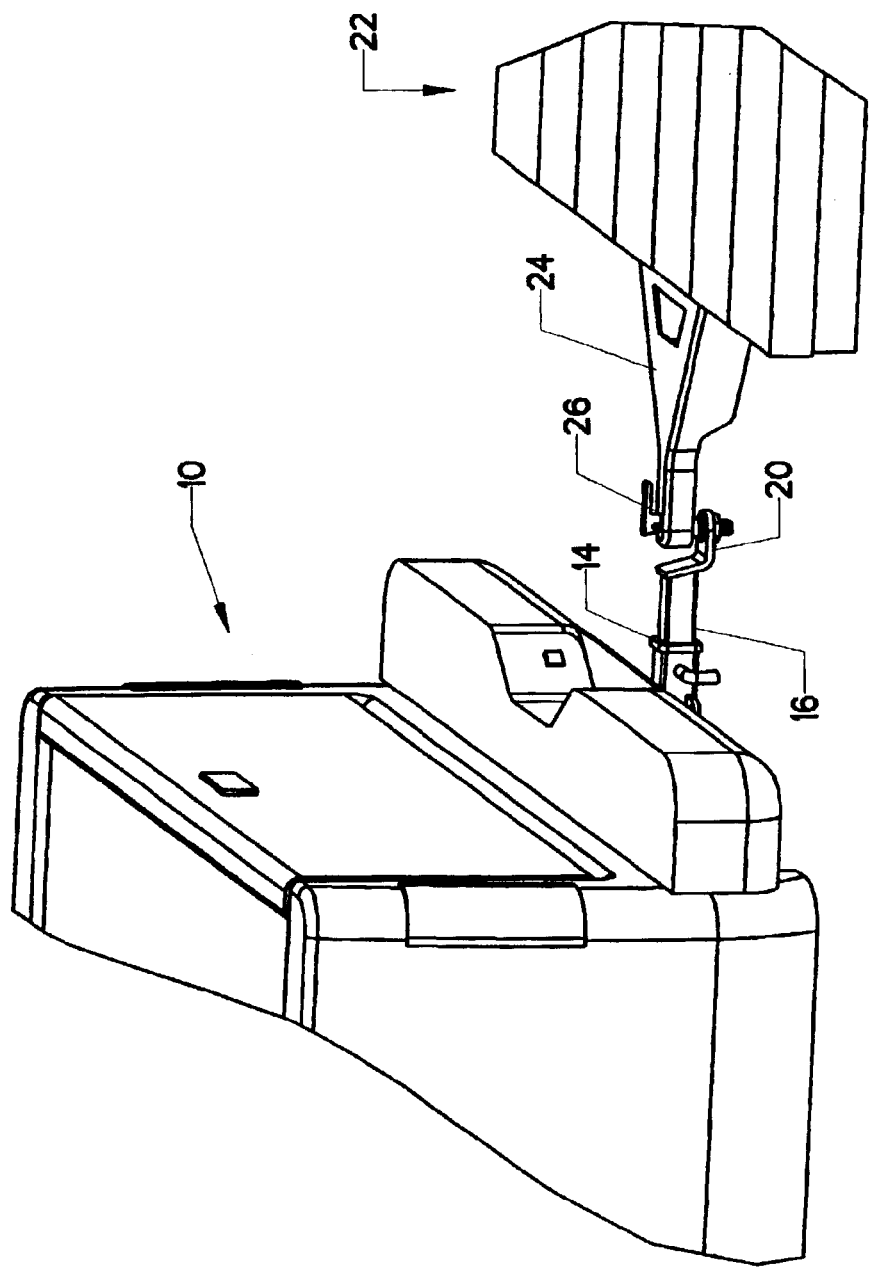
FIG. 2 is a perspective view, showing a prior art hitch with trailer attached.
Figure 3:
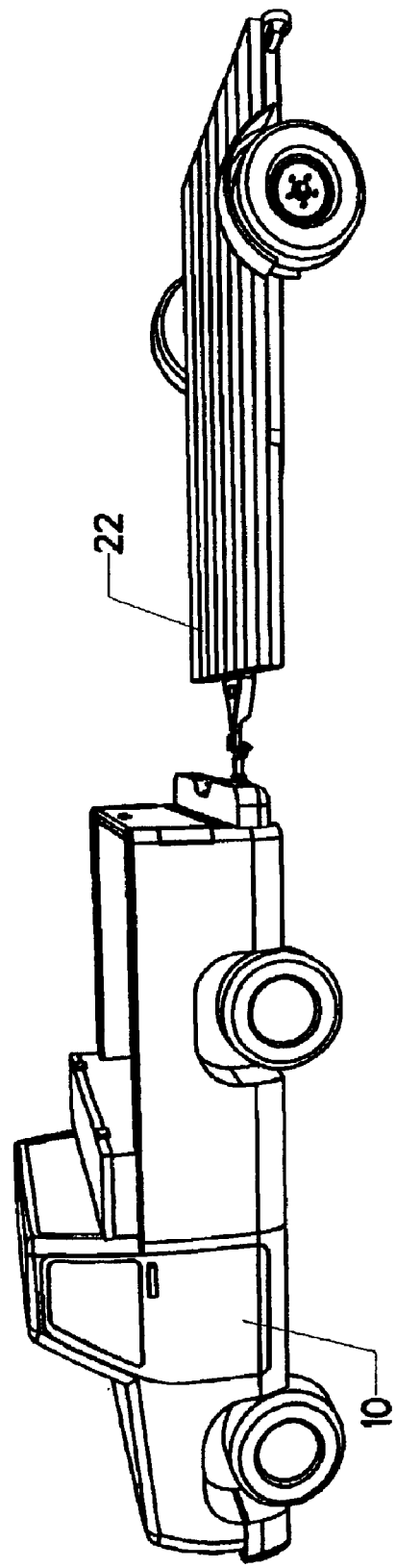
FIG. 3 is a perspective view, showing a vehicle with trailer attached.
Figure 4:
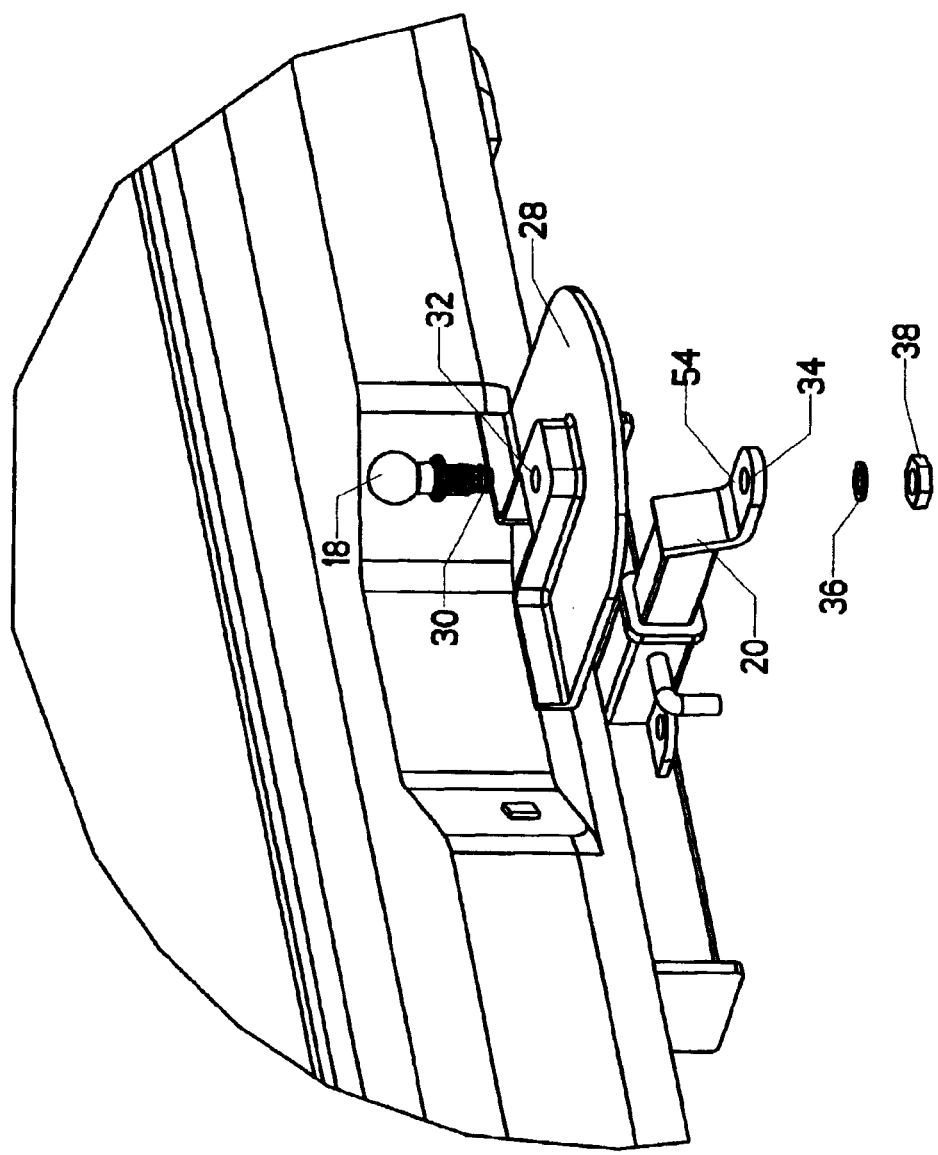
FIG. 4 is an isometric view, showing the present invention.

FIG. 4 shows the present invention positioned for installation. Hitch ball 18 is removed from ball mount 20 by removing nut 38 and lock washer 36. Hitch step 28 is then positioned over horizontal portion 54 of ball mount 20. The central portion of hitch step 28 is pierced by hole 32. Threaded shaft 30 of hitch ball 18 is passed through hole 32 and then through hole 34 in ball mount 20. Lock washer 36 and nut 38 are then threaded back onto the exposed portion of threaded shaft 30 to lock the assembly together.

Figure 5:
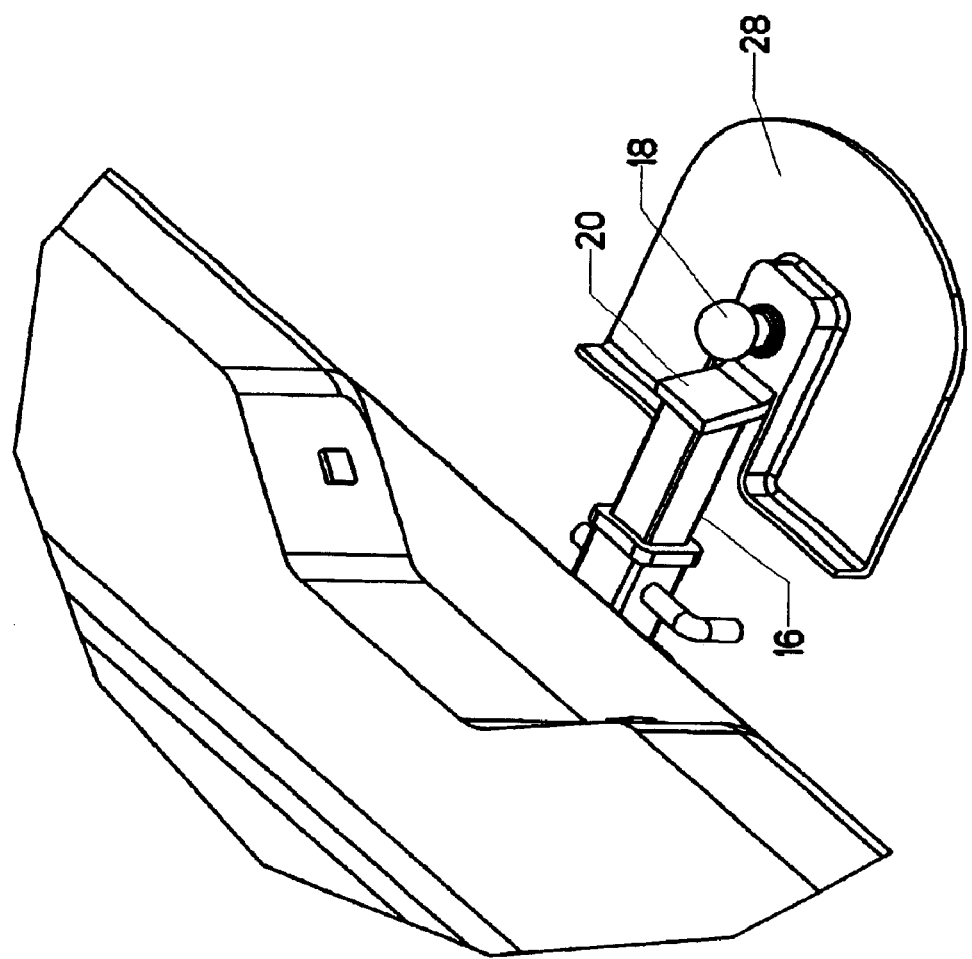
FIG. 5 is an isometric view, showing the present invention.

FIG. 5 shows the assembly after nut 38 has been tightened. The reader will observe that hitch ball 18 remains exposed above hitch step 28. The reader will also observe that clearance is provided for the angled portion of ball mount 20.

Figure 6:
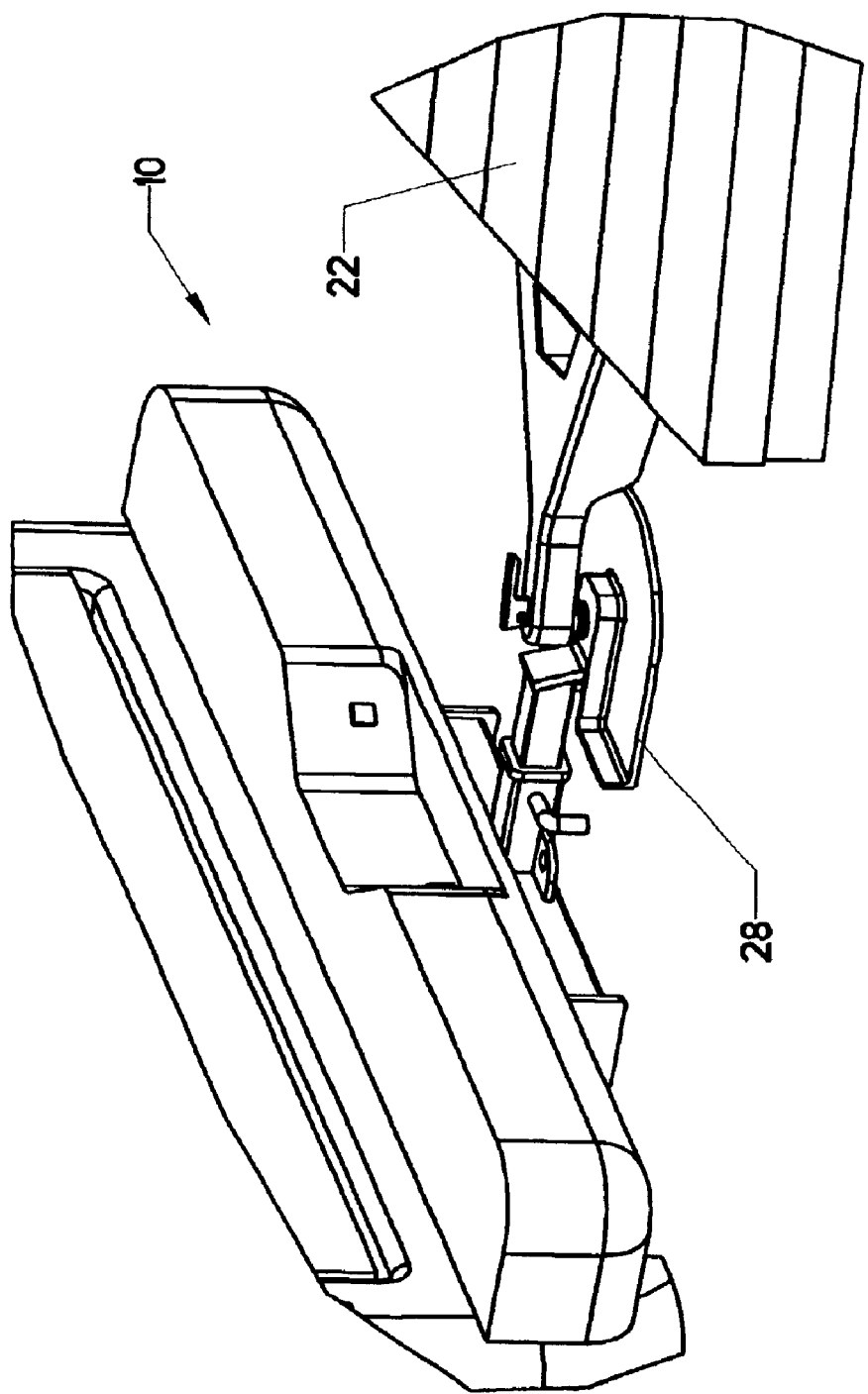
FIG. 6 is a perspective view, showing the invention in place with a trailer attached.

FIG. 6 shows the same assembly after a trailer 22 has been attached to truck 10. Hitch step 28 provides a large and stable stepping surface which allows a user to step up and over the drawbar and trailer tongue.

Figure 7A:
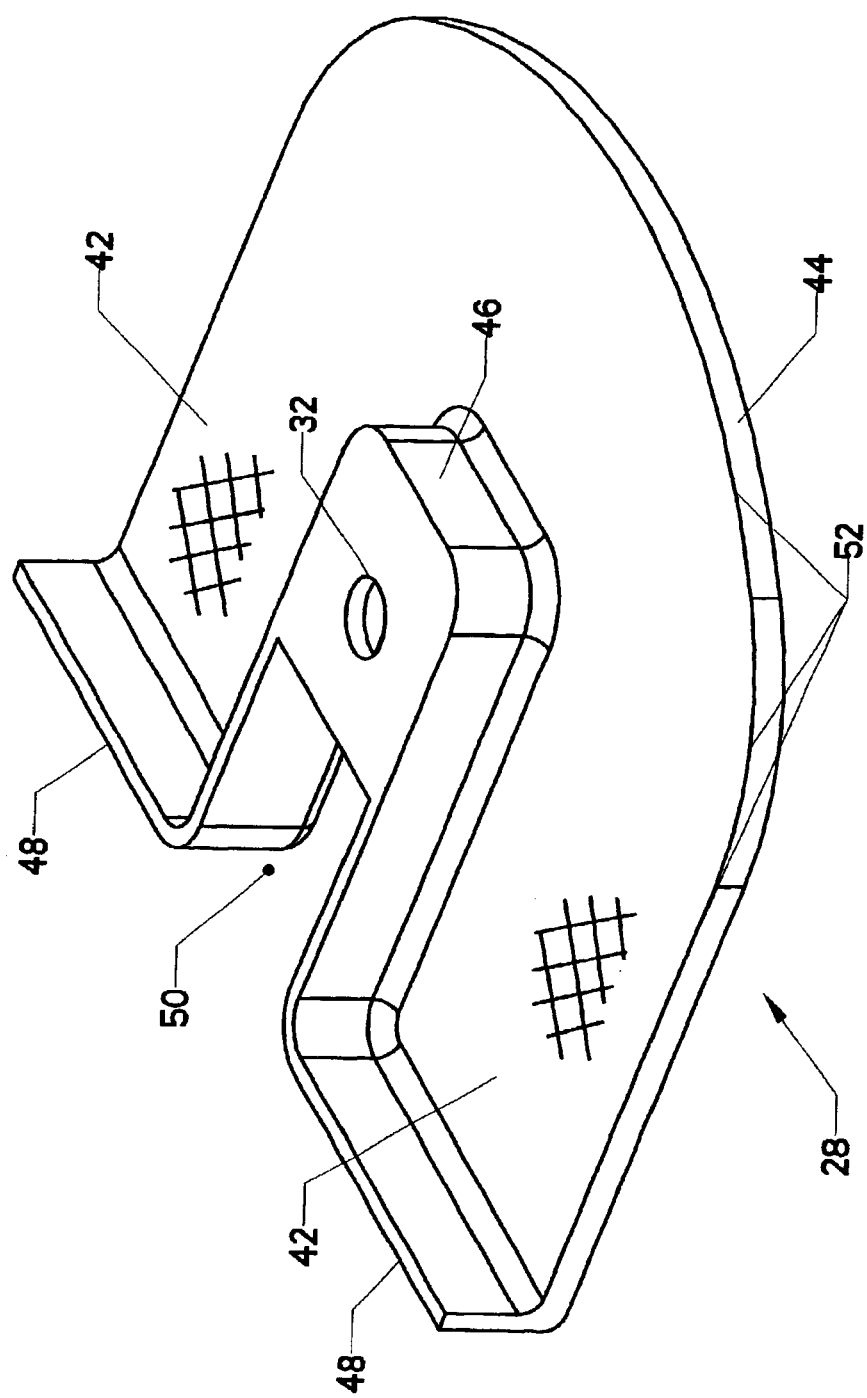
FIG. 7A is an isometric view of the present invention.

FIG. 7A shows hitch step 28 in greater detail. Its primary component is main plate 52. The upper surface of main plate 52 forms stepping surface 42. Stepping surface 42 is preferably textured or coated with friction-increasing substances to provide a non-slip surface. Logos and other graphics can also be embossed on this surface to add aesthetic appeal.

Ball mount receiver 46 lies in the center of hitch step 28. It is a hollow structure intended to receive ball mount 20. Its forward portion ("forward" with respect to its installed position on a vehicle) opens into relief cut 50, which is sized to allow clearance for portions of ball mount 20. The forward extremity of main plate 52 is bounded by flange 48, which reinforces the device and prevents a user's foot from slipping off the forward edge. The rear extremity of main plate 52 is bounded by arcuate edge 44, the purpose of which will be discussed subsequently.

FIG. 7B shows a view of hitch step 28 from underneath. The user will observe the hollow nature of ball mount receiver 46, as well as its relationship to relief cut 50.

Arcuate edge 44 is provided to allow clearance for the pivoting motion of a trailer tongue. FIG. 8 shows a top view of a truck 10 with hitch step 28 and trailer 22 installed. The truck and trailer are in a position corresponding to a left turn. The reader will observe that tongue 24 has pivoted in a clockwise direction. With respect to FIG. 6, the reader will note how portions of the trailer tongue hang down well below the level of hitch ball 18 (Different trailers have different elements, but most have some type of descending feature). Arcuate edge 44 allows the descending portions of tongue 24 to pivot without striking hitch step 28.

FIG. 9 shows the same assembly in a position corresponding to a right turn. Arcuate edge 44 again provides clearance for the descending portions of tongue 24.

FIG. 10 shows an alternate installation for hitch step 28. In this embodiment, hitch step 28 is actually installed beneath horizontal portion 54 of ball mount 20. While this version does work, it lacks an anti-rotation feature of the preferred embodiment. FIG. 5 represents the preferred embodiment. In observing FIGS. 5, 7A, and 7B, those skilled in the art will understand that the hollow interior of ball mount receiver 46 locks over horizontal portion 54 and prevents the rotation of hitch step 28 with respect to ball mount 20.

Hitch step 20 can be manufactured using many prior art techniques. It could, as one example, be welded together using plate steel. It can also be cast using aluminum. It could even be injection or resin-transfer molded using fiber-reinforced plastics. The selections of materials and manufacturing processes represent design choices, and are not critical to the present invention.

Although the preceding descriptions contain significant detail they should not be viewed as limiting the invention but rather as providing examples of the preferred embodiments of the invention. Accordingly, the scope of the invention should be determined by the following claims, rather than the examples given.

Having described my invention, I claim:

1. A step configured to be attached to a trailer hitch on a vehicle, wherein said trailer hitch includes a ball mount with a horizontal portion pierced by a hole through which a threaded shaft of a hitch ball is passed to attach said hitch ball to said ball mount by the addition of a nut threaded onto said threaded shaft, comprising:

a. a ball mount receiver, positioned proximate said horizontal portion;

b. wherein said ball mount receiver has a hole passing complete therethrough, so that said threaded shaft on said hitch ball can be passed through said hole in said ball mount receiver and said hole in said horizontal portion, and said nut can then be threaded onto said threaded shaft and tightened to lock said hitch ball, said horizontal portion, and said ball mount receiver together;

c. wherein said ball mount receiver is comprised of a horizontal wall connected to a first side wall, a second side wall, and a third side wall, so that said horizontal wall is placed over said horizontal portion of said ball mount and said first side wall, said second side wall, and said third side wall lie proximate said ball mount in order to prevent rotation of said ball mount receiver; and d. a stepping surface attached to said ball mount receiver.

2. A step as recited in claim 1, wherein the diameter of said hole in said ball mount receiver is smaller than said diameter of said hitch ball.

3. A step as recited in claim 2, wherein said stepping surface is textured to increase friction.

4. A step as recited in claim 1, wherein said ball mount receiver is placed on top of said horizontal portion.

5. A step as recited in claim 4, wherein said stepping surface is located below said ball mount receiver.

6. A step as recited in claim 5, wherein said stepping surface is textured to increase friction.

7. A step as recited in claim 4, wherein said stepping surface is textured to increase friction.

8. A step as recited in claim 1, wherein said ball mount receiver is placed beneath said horizontal portion.

9. A step as recited in claim 8, wherein said stepping surface is located below said ball mount receiver.

10. A step as recited in claim 9, wherein said stepping surface is textured to increase friction.

11. A step as recited in claim 8, wherein said stepping surface is textured to increase friction.

12. A step as recited in claim 1, wherein said stepping surface has a first extreme proximate said vehicle and a second extreme distal to said vehicle, and wherein said second extreme assumes the form of an arc.

13. A step as recited in claim 12, wherein said arc is centered approximately on said hole through said ball mount receiver.

14. A step as recited in claim 13, wherein said stepping surface is textured to increase friction.

15. A step as recited in claim 12, wherein said stepping surface is textured to increase friction.

16. A step as recited in claim 1, wherein said stepping surface is textured to increase friction.

\* \* \* \* \*